United States Patent
Machado et al.

(10) Patent No.: US 8,800,917 B2
(45) Date of Patent: Aug. 12, 2014

(54) AIRCRAFT ENGINE PYLON AFT AERODYNAMIC FAIRING

(71) Applicant: Airbus Operation SAS, Toulouse (FR)

(72) Inventors: Stephane Machado, Toulouse (FR); Fabien Raison, Toulouse (FR); Stephane Romani, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 136 days.

(21) Appl. No.: 13/682,138

(22) Filed: Nov. 20, 2012

(65) Prior Publication Data

US 2013/0221157 A1     Aug. 29, 2013

(30) Foreign Application Priority Data

Nov. 22, 2011   (FR) ..................................... 11 60650

(51) Int. Cl.
| | |
|---|---|
| *B64D 27/00* | (2006.01) |
| *B64D 29/02* | (2006.01) |
| *B64C 23/00* | (2006.01) |
| *B64C 7/02* | (2006.01) |

(52) U.S. Cl.
CPC .............. *B64C 23/005* (2013.01); *B64D 29/02* (2013.01); *B64C 7/02* (2013.01)
USPC .............................. 244/54; 244/53 R; 60/796

(58) Field of Classification Search
USPC ................................. 244/54, 53 R
See application file for complete search history.

(56) References Cited

U.S. PATENT DOCUMENTS

| | | | | |
|---|---|---|---|---|
| 4,238,092 | A * | 12/1980 | Brennan .......................... | 244/54 |
| 4,802,823 | A * | 2/1989 | Decko et al. ................. | 416/97 A |
| 7,352,744 | B2 * | 4/2008 | Saint Etienne et al. ........ | 370/389 |
| 7,445,179 | B2 * | 11/2008 | Diochon et al. ................. | 244/54 |
| 7,677,044 | B2 * | 3/2010 | Barbeln et al. .................. | 60/752 |
| 7,797,947 | B2 * | 9/2010 | Lafont et al. .................... | 60/796 |
| 7,971,826 | B2 * | 7/2011 | Journade et al. ................ | 244/54 |
| 7,988,092 | B2 * | 8/2011 | Bonnaud et al. .............. | 244/121 |
| 8,061,649 | B2 * | 11/2011 | Journade et al. ................ | 244/54 |
| 8,118,252 | B2 * | 2/2012 | Dumont et al. .................. | 244/54 |
| 2003/0201366 | A1 * | 10/2003 | Connelly et al. .............. | 244/121 |
| 2007/0102494 | A1 * | 5/2007 | Connelly et al. .............. | 228/157 |
| 2008/0067292 | A1 * | 3/2008 | Bonnaud et al. ........... | 244/199.1 |

(Continued)

FOREIGN PATENT DOCUMENTS

| | | |
|---|---|---|
| FR | 2 913 665 | 9/2008 |
| FR | 2921342 | 3/2009 |

OTHER PUBLICATIONS

French Search Report dated Aug. 8, 2012.

*Primary Examiner* — Christopher P Ellis
*Assistant Examiner* — Medhat Badawi
(74) *Attorney, Agent, or Firm* — Dickinson Wright PLLC

(57) ABSTRACT

An aircraft engine pylon aft aerodynamic fairing includes upper spars, transverse stiffening ribs, lower spars and a trailing edge where the upper spars and lower spars join together. In this fairing, a profiled structure is formed according to a profile open to the outside of the fairing. In a first end portion, the profiled structure comes to be enclosed between an end portion of the lower spars and the ends of at least one transverse stiffening ribs flush with the lower spars. This structure extends between the lower spars and the upper spars over a straight central portion inclined relative to the first end portion, and comes in a second end portion flush against a portion of the upper spars, parallel to the first end.

9 Claims, 4 Drawing Sheets

(56) References Cited

U.S. PATENT DOCUMENTS

| | | | |
|---|---|---|---|
| 2008/0217467 A1* | 9/2008 | Lafont | 244/54 |
| 2008/0224018 A1* | 9/2008 | Lafont et al. | 248/554 |
| 2008/0245926 A1* | 10/2008 | Journade et al. | 244/54 |
| 2008/0251633 A1* | 10/2008 | Journade et al. | 244/54 |
| 2009/0095443 A1* | 4/2009 | Connelly | 165/51 |
| 2009/0200418 A1* | 8/2009 | Beaufort | 244/54 |
| 2010/0051743 A1* | 3/2010 | Dumont et al. | 244/54 |
| 2010/0284313 A1* | 11/2010 | Monnier | 370/294 |
| 2011/0011972 A1* | 1/2011 | Vache | 244/54 |
| 2011/0155847 A1* | 6/2011 | Journade et al. | 244/54 |
| 2011/0290935 A1* | 12/2011 | Machado et al. | 244/54 |
| 2012/0047910 A1* | 3/2012 | Sutcu et al. | 60/796 |
| 2012/0080554 A1* | 4/2012 | Lafont et al. | 244/54 |
| 2013/0105622 A1* | 5/2013 | Journade | 244/54 |

* cited by examiner

AIRCRAFT ENGINE PYLON AFT AERODYNAMIC FAIRING

TECHNICAL FIELD

The invention relates to an aft aerodynamic fairing for an aircraft engine attachment pylon. The function of such a pylon is to rigidly connect the engine to the wing of the aircraft.

The invention applies to any type of aircraft equipped with any type of engine, such as jet turbine engines or propeller turbine engines.

With such a pylon it is possible to suspend the engine under the wing or to position the engine above the wing.

Below, qualifiers like "upper" and "lower" relate to an engine suspension configuration under the wing in standard use. In configuration with the engine above the wing, the qualifiers of the cited type would of course be inverted. Additionally, the "fore" and "aft" location terms and their equivalents are understood as based on a standard use of the aircraft in its typical in-flight movement.

STATE OF THE ART

As shown in the lateral view from FIG. 1, the aircraft pylons 1 are made of a central structure 10 surrounded by secondary aerodynamic structures and fairings, specifically: fore 11 and aft 13 upper aerodynamic structures, on either side of the fairing for connection 12 to the wing 2. An aft aerodynamic fairing 3, or APF (Aft Pylon Fairing), is generally arranged both under the central rigid structure 10 and under the aft aerodynamic structure 13.

It is also possible to send the fuel supply, electric cables, and the hydraulic and pneumatic lines between the engine 4 and the aircraft through the pylon 1. Additionally, the pylon is generally equipped with two engine attachment systems, the fore 14 and aft 16 attachments, between the central rigid structure 10 and two engine cowls, respectively the fan cowl 15 and the one for the propulsion turbine 17. Additionally, two lateral thrust bracing rods 18 connect the aft of the fan cowl 15 to the aft attachment device 16 of the engine 4.

The pylon structures can also segregate the various systems and support the fairings. They are typically made up of box type structures formed by the assembly of upper and lower spars connected by lateral panels and made rigid by a series of transverse stiffening ribs. These box type structures are designed for transmitting to the wing 2 the static and dynamic forces generated by the engines: weight, thrust, dynamic stresses and vibrations. As for the fairings, they have the general shape of panels fitted onto the structures.

In particular, the aft aerodynamic fairing 3 (or APF) has a significant function in the aerodynamic drag and the stability of the pylon assembly. Conventionally it has the shape of an open box structure on the upper part because it is connected to other pylon structures exactly by this opening.

This box structure comprises upper spars L1, lateral panels 31 attached to the transverse stiffening ribs, a floor 33 made of spars made rigid with a bottom of material suited for providing thermal protection and also a trailing edge 35 ending in a drain 37. The trailing edge serves as an aerodynamic closure and the drain is provided with a pipe 38 for collection and evacuation of parasitic liquids by connecting the assembly to the air.

During assembly, the trailing edge 35 is mounted on the floor 33 and the panels 31, and the drain is welded on the trailing edge 35, the panels 31 and the upper spars L1.

The floor 33 of the aft aerodynamic fairing 3 is exposed to the primary gas flow F1 escaping from the nozzle 19 and at particularly high temperature (capable of reaching 550° C., for example). In contrast, the lateral panels 31 of this fairing are in contact with the secondary airflow F2 circulating on the periphery of the primary flow F1. Coming from the outside and having just been straightened after having passed through the fan, this secondary flow F2 remains at very low or even negative temperatures (from −10 to −40° C. for example).

Hence, the heavier and heavier and larger and larger volume structures of the engines 4 lead to the breakdown of the rear fairing by increasing vibrations. The issue of making the rear fairing rigid is therefore addressed in order to fight against these vibrations and against the deformations resulting from the temperature gradients that the panels and floor of the aft fairing 3 are subject to.

To fight against the deformations and vibrations, it is known to oversize the internal transverse stiffening ribs or use high cost materials having superior properties of thermal mechanical resistance. The patent document FR 2,913,665 calls for forming the floor of the rear fairing in segments assembled to the stiffening ribs by means which offset these segments. With this structure it is certainly possible to absorb thermal expansions, but it does not make the structuring easier and does not allow damping of vibrations.

DESCRIPTION OF THE INVENTION

The invention aims to overcome these disadvantages by proposing a structural connection with which to pass on the forces and hold the fairing assembly without going by the panels.

More specifically, the purpose of the present invention is an aft aerodynamic fairing for an aircraft engine attachment pylon comprising upper spars, transverse stiffening ribs, lower spars and a trailing edge. The upper and lower spars join together in a V configuration at the trailing edge side. In this fairing, a structural structure is formed in the trailing edge according to a profile open to the outside of the fairing. In a first end portion, the structure comes to be enclosed between an end portion of the lower spars and the ends of transverse stiffening ribs flush longitudinally with the lower spars. It extends between the lower spars and the upper spars over a straight central portion inclined relative to this first end portion where the central portion is suitable for receiving the trailing edge. In a second end portion, it comes flush against a portion of the upper spars, in parallel with said first end.

According to some preferred embodiments:

The portion for connecting the upper spars to the structure leaves the end of the end edges of said upper spars free so as to allow the consolidated integration of the trailing edge connecting with the end of the upper spars.

The first end portion of the structure is attached through an attachment of the stiffening rib(s)-structure-spars assembly.

The structure is implemented by welding two half shells to form a U-shaped profile.

The enclosure of the structure on the lower spars is done by joggling of the structure on these spars.

The trailing edge is made up of a sheet of metal folded longitudinally along an edge to form two pieces incorporated in the structure in order to be attached all along the two sides of the profile of the structure.

The structure is formed of two identical half shells welded to each other longitudinally along a median line.

A drain is incorporated removably by a cutout of the trailing edge on the side of the upper spars.

FIGURES

Other data, features and advantages of the present invention will appear upon reading the non-limited description which follows, with reference to the attached figures which show, respectively:

DETAILED DESCRIPTION

Figure 1:
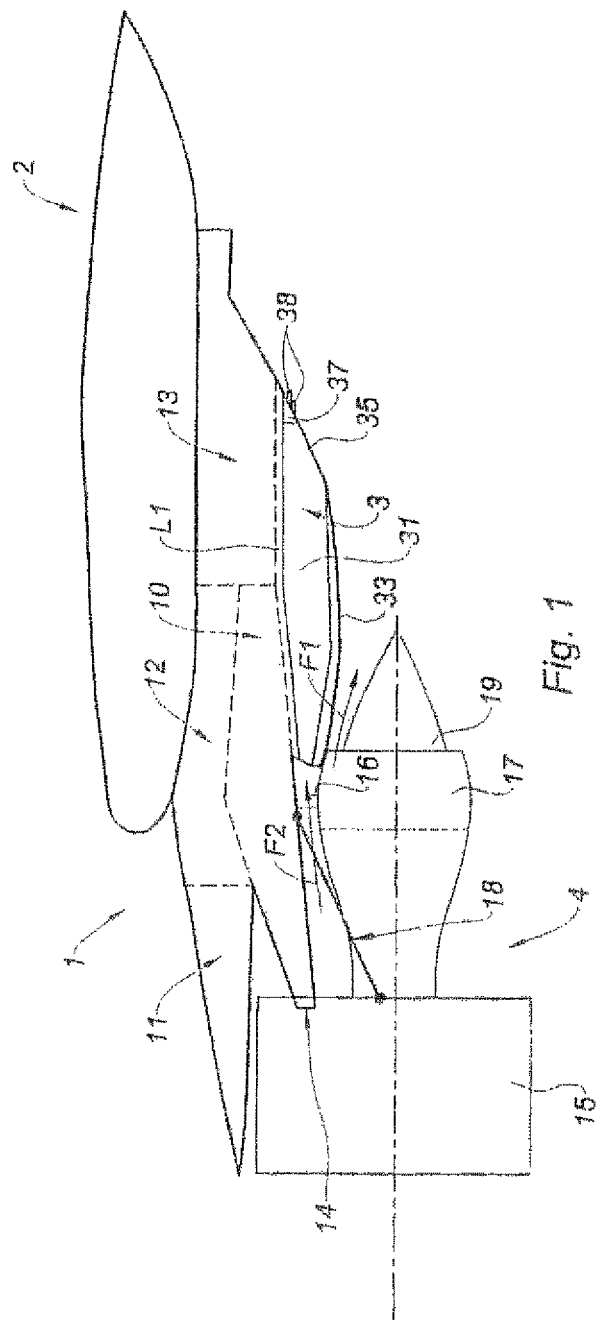
FIG. 1 shows a lateral view of an aircraft engine pylon (already discussed).
Figure 2:
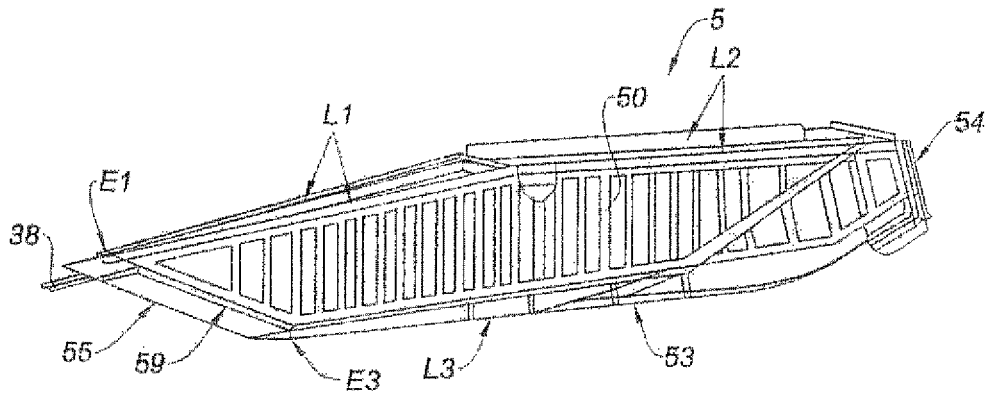
FIG. 2 shows an overall view of an aft fairing example according to the invention.

Referring to the overall view in FIG. 2, an example of aft fairing 5 according to the invention is shown in the form of an open box structure in its upper part. This box structure comprises upper spars L1 and L2. The aft upper spars L1 join in a V at the aft ends E1 thereof, whereas the fore upper spars L2 remain parallel.

In FIG. 2, the lateral panels are riot illustrated in order to show the transverse stiffening ribs 50 which are arranged from the leading edge 54 to the trailing edge 55. The floor 53 is made up of lower spars L3 which come together in a V at the trailing edge. A structure 59 joins the aft ends E1 and E3 respectively of the upper spars L1 and lower spars L3, in a manner which will be described below with reference to FIGS. 3 to 5. The trailing edge 55 is mounted on the structure 59. The trailing edge 55 functions as aerodynamic closure and as drain provided with tubes 38 for collecting and evacuating leaking liquids, already described above.

Figure 3:
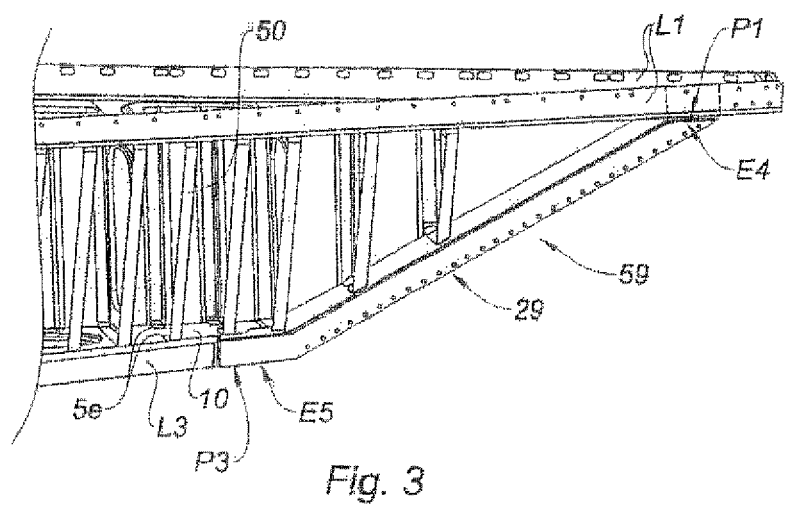
FIG. 3 shows a view of the aft portion of the fairing according to FIG. 2 with connections between the structure and the upper and lower spars.

Referring to FIG. 3, the end portions E4 and E5 of the structure 59 are seen, respectively, connected with the aft upper spars L1 and lower spars L3. The structure 59 is also connected to the transverse stiffening ribs 50, to four stiffening ribs in the nonlimiting example shown. The general shape of the structure 59 is referred to as Z because of the inclined central portion thereof and the parallel ends thereof.

The structure 59 is referred to as structural because it participates in the general resistance of the APF 5. It is structured in the form of an open U profile in the example, with the profile turned towards the outside of the fairing 5. In end E5, the structure comes to be enclosed between a corresponding end portion P3 of the lower spars L3 and the ends 5e of transverse stiffening ribs 50 flush longitudinally with lower spars L3. This enclosure is consolidated by bolting between the ends 5e and the lower spars L3 through a floor 10.

The structure 59 extends between the lower spars L3 and the aft upper spars L1 over a straight central portion 29, inclined relative to the end E5 thereof and the spars. This structure 59 comes at end E4 flush against a portion P1 of the upper spars L1, where E4 is parallel to the other end E5. The contact area between the structure 59 and the upper spars L1 is a result of the inclination of the central portion 29.

Figure 4:
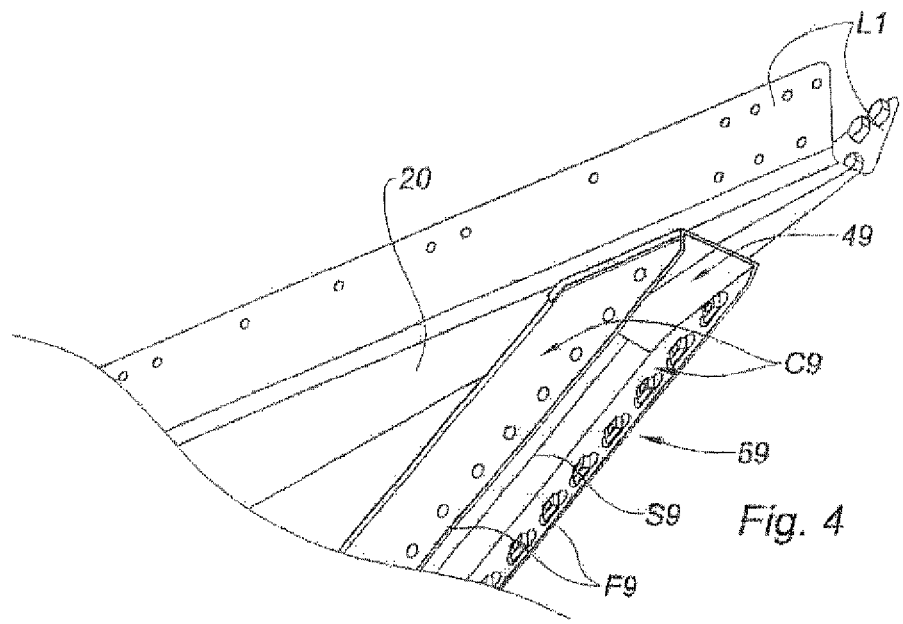
FIG. 4 shows an enlarged view of the structure/upper spars connection of said fairing.

FIG. 4 shows more precisely the connection between the upper spars L1 and the structure 59. Bearing against the spars L1, a part 49 connected by welding onto the structure 59 is screwed onto a bottom deck 20 which connects the spars L1 at their lower base. The U-shaped profile of the structure 59 can be seen in this view: it is composed of two identical half-shells C9, welded to each other along the median weld line S9. Floating screws E9 are inserted along the sides F9 of the profile for attaching the trailing edge in the mariner described below with reference to FIG. 7. Other floating screws E9 are also seen on the spars L1 for attaching the panels of the APF as will be brought up below in connection with FIG. 8.

Figure 5:
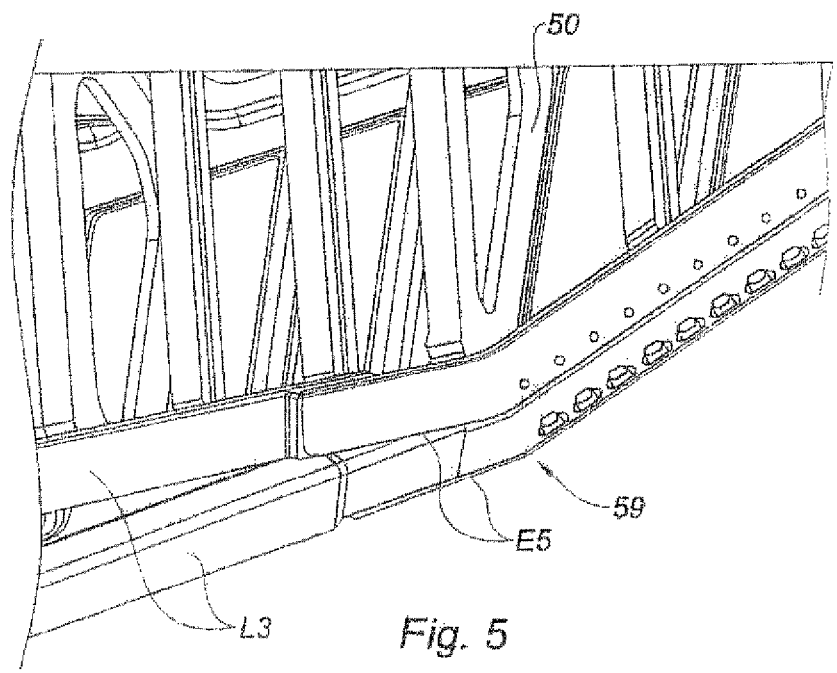
FIG. 5 shows an enlarged view of the structure/lower spars connection of said fairing.

With reference to FIG. 5, it can be seen that a connection between the structure 59 and the spars L3 is formed by joggling. This joggling leads to a slight deformation of the end portion E5 of the structure 59 because of the separation of the lower spars L3 in V.

Figure 6:
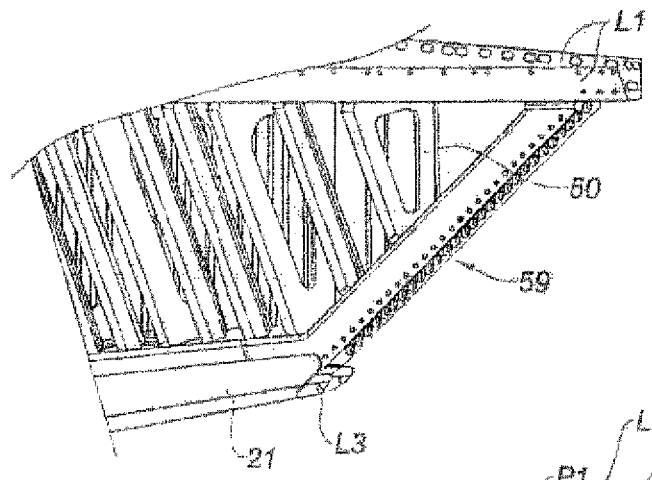
FIG. 6 shows a view of the aft portion of the aft fairing after placement of the thermal protection coating.

These lower spars L3 are covered by bonding or thermal fusion with a coating 21 of aluminum-based thermal protection or of fibers/resin composite material. The aft positioning of the coating 21 is illustrated in FIG. 6.

Figure 7:
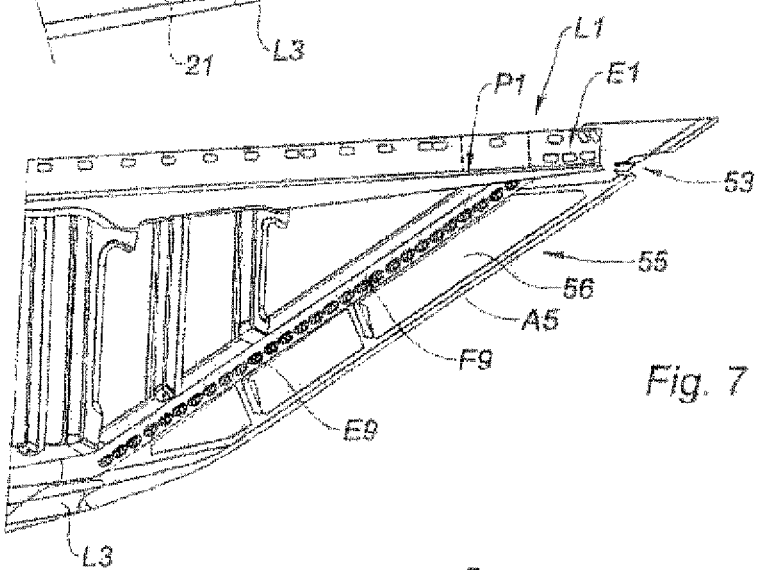
FIG. 7 shows a longitudinal section view of said faring after incorporation of the trailing edge.
Figure 8:
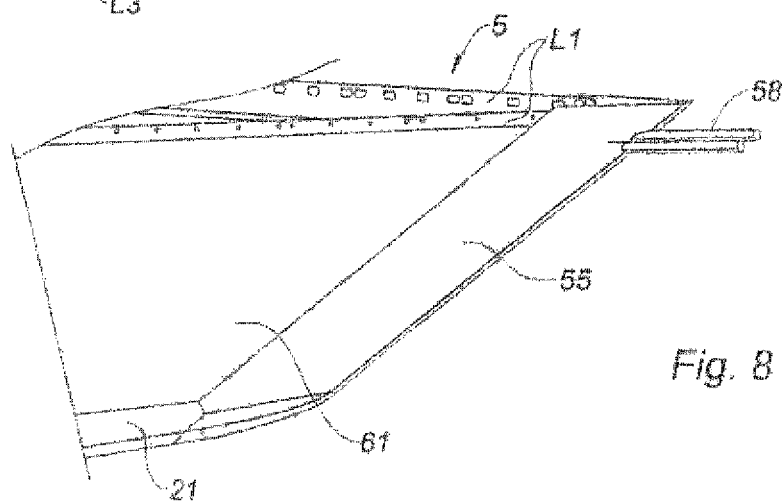
FIG. 8 shows a lateral view of said faring after attachment of the lateral panels.

Additionally, the trailing edge 55, formed of a titanium sheet folded along an edge A5, is attached to each side F9 of the structure 59 as the longitudinal section view in FIG. 7 shows. a lineup of floating screws E9 provides the connection between each part 56 of the trailing edge 55 and each side F9 of the structure. The portion P1 of the upper spars L1 connecting to the structure 59 leaves the end E1 of these upper spars free so as to allow a consolidated integration of the trailing edge 55 connecting with the end E1 of the upper spars L1.

An opening 53 is cut out towards the upper end of the trailing edge 55 in order to incorporate the drain for evacuating liquids. The tubes 58 for collecting and evacuating liquids from the drain incorporated in the trailing edge 55 can be seen in FIG. 8. In this FIG. 8, which shows in frontal view the aft part of an APF 5 according to the invention at the end of assembly, the lateral panels 61 mounted on the spars and stiffening ribs by means of floating screws E9 and also the thermal protection coating 21 are also seen.

The invention is not limited to the sample embodiments described and shown. Thus, the section profile of the structure 59 can be varied, for example in V or in W. Additionally, the materials used for the APF can be aluminum or composite material.

The invention claimed is:

1. Aft aerodynamic fairing (5) for an aircraft engine (4) attachment pylon (1) comprising upper spars (L1), transverse stiffening ribs (50), lower spars (L3) and a trailing edge (55) where the upper spars (L1) and lower spars (L3) join together in a V configuration at the trailing edge side (55) characterized in that a structural structure (59) is formed in the trailing edge according to a profile open to the outside of the fairing (5), and in that the structure (59) in a first end (E5) comes to be enclosed between a corresponding end portion (P3) of the lower spars (L3) and the ends (5e) of at least one transverse stiffening rib (50) flush longitudinally with lower spars (L3), extends between the lower spars (L3) and the aft upper spars (L1) over a straight central portion (29) inclined relative to the end (E5) thereof and the spars, where this central portion (29) is suitable for receiving the trailing edge (55), and comes at a second end portion (E4) flush against a portion (P1) of the upper spars (L1), parallel to said first end (E5).

2. Fairing according to claim 1, in which the portion (P1) for connecting the upper spars (L1) to the structure (59) leaves the end (E1) of said upper spars free so as to allow a consolidated integration of the trailing edge connecting with said end (E1) of the upper spars.

3. Fairing according to one of claim 1, in which the first end portion (E5) of the structure (59) is attached through an attachment of the stiffening rib(s)-structure-spars assembly.

4. Fairing according to claim 1, in which the structure (59) is implemented by welding two half shells (C9) to form a U-shaped profile.

5. Fairing according to claim 1, in which the enclosure of the structure (59) on the lower spars (L3) is done by joggling of the structure on these spars.

6. Fairing according to claim 1, in which the trailing edge (55) is made up of a sheet of metal folded longitudinally along an edge (A5) to form two pieces (56) incorporated in the structure in order to be attached all along the two sides (F9) of the profile of the structure (59).

7. Fairing according to claim 1, in which the structure (59) is formed of two identical half shells (C9) welded to each other longitudinally along a median line (S9).

8. Fairing according to claim 1, in which a drain is incorporated removably by a cutout of the trailing edge (55) on the side of the upper spars (L1).

9. Fairing according to claim 1, in which lateral panels (61) and also a thermal protection coating (21) are rigidly joined respectively with the stiffening ribs (50) and lower spars (L3).

\* \* \* \* \*